United States Patent
Andersson et al.

(10) Patent No.: US 9,264,692 B2
(45) Date of Patent: Feb. 16, 2016

(54) DEPTH BUFFER COMPRESSION FOR STOCHASTIC MOTION BLUR RASTERIZATION

(75) Inventors: Magnus Andersson, Helsingborg (SE); Tomas G. Akenine-Moller, Lund (SE); Jon N. Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 13/991,430

(22) PCT Filed: Apr. 26, 2012

(86) PCT No.: PCT/US2012/035084
§ 371 (c)(1),
(2), (4) Date: Jun. 4, 2013

(87) PCT Pub. No.: WO2012/149084
PCT Pub. Date: Nov. 1, 2012

(65) Prior Publication Data
US 2013/0250060 A1   Sep. 26, 2013

Related U.S. Application Data

(60) Provisional application No. 61/480,159, filed on Apr. 28, 2011.

(51) Int. Cl.
*H04N 13/00* (2006.01)
*G06T 9/00* (2006.01)
*G06T 15/40* (2011.01)

(52) U.S. Cl.
CPC ............ *H04N 13/0048* (2013.01); *G06T 9/004* (2013.01); *G06T 15/405* (2013.01)

(58) Field of Classification Search
CPC .................................................. H04N 13/0048
See application file for complete search history.

(56) References Cited

U.S. PATENT DOCUMENTS

| | | | |
|---|---|---|---|
| 6,956,576 B1 | 10/2005 | Deering | |
| 7,336,820 B2 | 2/2008 | Ji | |
| 7,382,368 B1 | 6/2008 | Molnar et al. | |
| 2010/0296746 A1* | 11/2010 | Strom et al. | 382/233 |

OTHER PUBLICATIONS

PCT International Search Report and Written Opinion issued in corresponding PCT/US2012/035084 dated Nov. 20, 2012 (10 pages).
Akenine-Moller, T., et al., Stochastic Rasterization using Time-Continuous Triangles. In Graphics Hardware, 2007, ACM SIGGRAPH, Eurographics Symposium Proceedings, San Diego, CA, Aug. 4-5, 2007, pp. 7-16.
Brunhaver, J., et al., "Hardware Implementation of Micropolygon Rasterization with Motion and Defocus Blur", In High Performance Graphics, pp. 1-9.

(Continued)

*Primary Examiner* — Dave Czekaj
*Assistant Examiner* — Nam Pham
(74) *Attorney, Agent, or Firm* — Trop, Pruner & Hu, P.C.

(57) ABSTRACT

A depth buffer compression scheme uses bilinear patches as a predictor for depth. The scheme targets compression of scenes rendered with stochastic blur rasterization. A tile of fragments may be split into two or more regions and a higher-degree function may be fit to each region. The residuals are then stored as delta corrections.

30 Claims, 5 Drawing Sheets

(56) References Cited

OTHER PUBLICATIONS

Cook, R. L., et al., "The Reyes Image Rendering Architecture," In Computer Graphics (Proceedings of SIGGRAPH 87), 1987m vol. 21, pp. 95-102.
Dally, W., "Power Efficient Supercomputing," Accelerator-based Computing and Manycore Workshop (presentation).
Fatahalian, K., et al., "Data-Parallel Rasterixation of Micropolygons with Defocus and Motion Blur," In High Performance Graphics, 2009, pp. 59-68.
Gribel, C.J. et al., "Analytical Motion Blur Rasterization with Compression," In High Performance Graphics, 2010, pp. 163-172.
Hasselgren, J., et al., "Efficient Depth Buffer Compression," In Graphics Hardware, 2006, pp. 103-110.
Lloyd, D.B., et al., "Practical Logarithmic Rasterization for Low-Error Shadow Maps," In Graphics Hardware, 2007, pp. 17-24.
McGuire, M., et al., "Real-Time Stochastic Rasterization on Conventional GPU Architectures," In High Performance 2010, pp. 173-182.
Morein, S., ATI Radeon HyperZ Technology. In Workshop on Graphics Hardware, Hot3D Proceedings, ACM Press, 2000.
Owens, J.D., "Streaming Architectures and Technology Trends," in GPU Gems 2. Addison-Wesley, 2005, pp. 457-470.
Salvi, M., et al., "Adaptive Volumetric Shadow Maps," Computer Graphics Forum (Proceedings of EGSR) vol. 29, Issue 4, Jun. 2010, pp. 1289-1296.
Extended European Search Report dated Oct. 22, 2014 by the European Patent Office in Application No. 11858139.6 (10 pgs).
Andersson, M., et al., "Depth Buffer Compression for Stochastic Motion Blur Rasterization," High Performance Graphics, ACM, 2 Penn Plaza, Suite 701, NY, NY 10121-0701, dated Aug. 5, 2011 (8 pages).
Hasselgren, J., et al., "Efficient Depth Buffer Compression," Graphics Hardware, 2006 Conference, Vienna, Austria, Sep. 3, 2006; retrieved from the Internet: http://www.cs.cmu.edu/afs/cs.cmu.edu/academic/class/15869-f11/www/readings/hasselgren06_zcompression.pdf (8 pages).
Akenine-Moller, T. G., et al., "Stochastic Rasterization using Time-Continuous Triangles," Graphics Hardware, Jan. 1, 2007; retrieved from the Internet: http://citeseerx.ist.psu.edu/viewdoc/download;jsessionid=933007474B3538B7ED6352ADA225F8EE?doi=10.1.1.120.5567&rep=rep1&type=pdf (12 pages).
Akenine-Moller, T. G., et al., "Bezier Patches," Real-Time Rendering, 3rd Edition, Jul. 25, 2008 (6 pages).
Sellares, T., "Surfaces," Universitat de Girona, Nov. 3, 2010; retrieved from the Internet: http://ima.udg.edu/~sellares/MEG/surfacesMEG09.pdf (18 pages).

* cited by examiner

FIG. 8

DEPTH BUFFER COMPRESSION FOR STOCHASTIC MOTION BLUR RASTERIZATION

BACKGROUND

This relates generally to compression of depth buffers.

Previous depth buffer compression schemes compress the depth obtained by rasterizing static triangles. This provides generous bandwidth usage savings, and so is of great importance to graphics processors. However, stochastic rasterization for both motion blur and depth of field is becoming a reality even for real-time graphics, and previous depth buffer compression algorithms fail due to the irregularity of the positions and depth of the rendered fragments.

BRIEF DESCRIPTION OF THE DRAWINGS

Some embodiments are described with respect to the following figures.

DETAILED DESCRIPTION

Our algorithm can be used to compress depth values from scenes rendered without blur (i.e., without motion blur, and depth of field), but also with blur, generated from stochastic rasterizers (e.g., motion blur).

Our algorithm may use no information from the rasterizer, in one embodiment, which is a huge advantage in terms of complexity, and so the input may be basically just a set of (x_i, y_i, d_i), where (x_i, y_i) is the position in screen space of the sample, and d_i is the depth of the sample. We compress a set of such samples so that it can be stored in offchip memory in compressed form. Our algorithm computes a bilinear patch for non-blurred scenes, and a trilinear patch for blurred scenes, where time, t, is used as a third dimension. These patches are often called predictor functions. We can also use planes in four dimensions (x,y,z,t). The idea is, briefly, to guess the location of the patch, and to encode differences relative to this patch. The patch in itself requires relatively little storage, and the differences are encoded using much fewer bits than the actual depth values. This often makes it possible to compress a block of samples down to 25%, 50%, or 75% (for example) of its original memory consumption. The savings will only be in terms of memory bandwidth usage. However, note that the gap between compute power and available memory bandwidth continues to grow, and architectures will most likely be bandwidth limited for the foreseeable future.

A very simple general framework describes depth buffer compression schemes. Let us start with some assumptions. A block of w×h pixels, sometimes called a tile, is processed independently, and we assume that each pixel has n samples. The i:th sample is denoted by $S^i = (S_x^i, S_y^i, S_t^i, S_d^i)$, where the first two components are the x- and y-coordinates of the sample inside the tile, and the third component, $S_t^i \in [0,1]$, is the time of the sample. It is also possible to add more components, for example, $(S_u^i, S_v^i)$, for the lens position for depth of field rendering. Current depth compression schemes do not handle motion blur and depth of field explicitly, and hence do not have the time component nor the lens parameters. Note that all of $(S_x^i, S_y^i, S_t^i)$, are fixed for a particular sample, and it is only the depth, $S_d^i = z/w$, that results from rasterization. As a consequence, only the depth values, $S_d^i$, may be compressed. However, it is up to the algorithm to exploit the fixed components for better compression, if possible.

Figure 1:
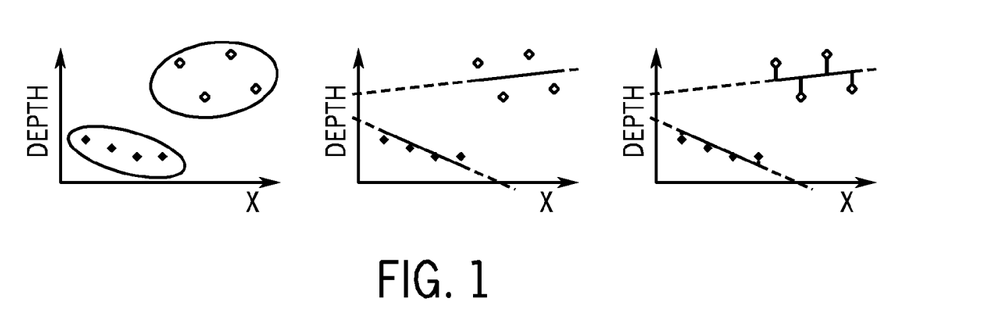
FIG. 1 is an illustration of the three steps of a depth buffer compression algorithm according to one embodiment.

Depth buffer compression schemes, shown in FIG. 1, generally share three common steps, and these are:
1. clustering,
2. predictor function generation, and
3. difference encoding.

It should be noted, though, that an algorithm may not have one or two of the steps above. A high level description of each of the steps follows.

Clustering is needed when there are, for example, a set of samples in a tile that belongs to a background layer, and the rest of the samples in the tile belong to a foreground layer. In these cases, it is very hard to compress all depths in the tile using the same predictor function. The clustering step therefore attempts to separate the samples of a tile into two or several layers, where the samples in each layer typically should share some characteristics (e.g., being close to the camera). The goal of splitting the samples into two or more layers is that each layer should ideally become simpler to compress compared to compressing all samples as a single layer. For a tile with only foreground samples though or when only one triangle covers an entire tile, clustering may not be needed. In general, a bitmask or several bitmasks are needed to indicate which layer a sample belongs to.

As the next step, each layer generates its own predictor function. The goal here is to use the depth samples and possibly their fixed (x, y, t)-coordinates to create a predictor function, d(x, y, t), whose task is to attempt to predict the depth at each sample using an inexpensive (in terms of storage, generation, and evaluation) function. For example, assume that a rectangle with small per-pixel displacements has been rendered to a tile. As a predictor function, one may use the plane of the rectangle, since it probably is a good guess on where the depth will be. This guess will not be 100% correct, and so it is up to the next step to correct this.

Difference encoding must make sure that the exact depths, $S_d^i$, can be reconstructed during decompression of the tile, since a common requirement by graphics application program interfaces (APIs) is that the depth buffer is non-lossy. The difference between the predictor function, d(x, y, t), and the samples' depths are computed as:

$$\delta_i = d(x,y,t) - S_d^i. \tag{1}$$

Given a good predictor function, the differences, $\delta_i$, between the depth of the samples and the predictor function should be small. As a consequence, the deltas should be encoded using few bits. Good compression ratios can be achieved if there are a small number of layers, so that the predictor function is stored using few bits, and so that the deltas can be encoded using few bits as well. Another success factor of a compression scheme is that the algorithm should actually become activated on many tiles during rendering.

Figure 5:
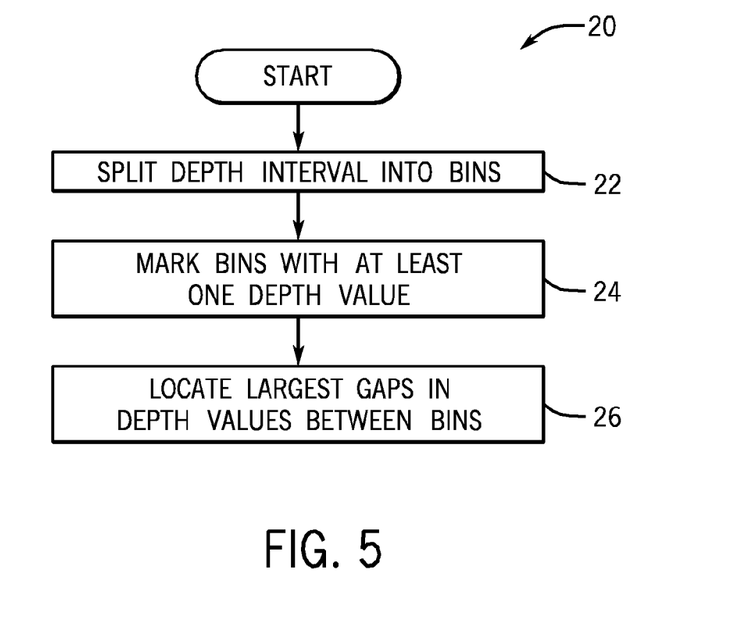
FIG. 5 is a flow chart for clustering according to one embodiment of the present invention.

First, we split the depth interval between $Z_{min}$ and $Z_{max}$ for the tile into n bins as shown in block 22 of FIG. 5. For each bin, we store one bit, which records whether there is at least one sample in the bin. The bits are initialized to zero. Each sample is then classified to a bin based on the sample's depth value, and the corresponding bit is set to one as indicated in block 24. Samples that are cleared may be ignored in this step. When all samples have been processed, each 0 signals a gap in depth of at least $(Z_{max}-Z_{min})/n$. By finding the largest range of consecutive zeroes as shown in block 26, a good approximation of the separation of the two depth layers is obtained.

Figure 2:
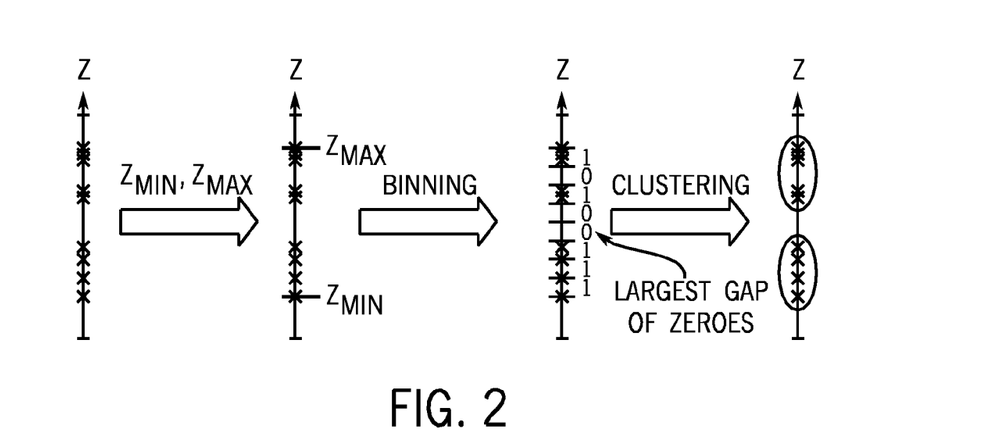
FIG. 2 is a sketch of a clustering technique in accordance with one embodiment.

From left to right in FIG. 2, the depth values are marked as crosses on the depth axis, and these depth values are then bounded by $Z_{min}$ and $Z_{max}$. Then follows binning where, in this case, eight small bins between $Z_{min}$ and $Z_{max}$ are created, and bins with at least one depth sample are marked with 1, and otherwise they are marked with 0. Finally, the largest gaps of zeroes are found, and this separates the depths into two layers. Each of the sample clusters produced by this step is then processed independently as a layer by the predictor function generation step. In addition, the clustering process implicitly generates one or more bitmasks that indicate which layer each sample belongs to. The bitmask(s) will be part of the compressed representation of a tile. If needed, the samples can be clustered into more layers simply by finding the second and third (and so on) longest ranges of consecutive zeroes. It is also possible to generalize this concept further. Instead of having one bit per bin, we store a counter per bin, which records how many depth samples fall within that bin. Clustering is then done by finding the deepest and longest "valleys" in a diagram, where y is the counter as a function of bin (x). This can produce better results.

At this point, we have a bitmask, generated from the previous step, indicating which of the tile's w×h×n samples that should be compressed for the current layer. Note that we may have only one layer, in which case all samples are included.

Most depth buffer compression schemes rely on the fact that depth d=z/w is linear in screen space, that is:

$$d(x,y)=z(x,y)/w(x,y)=a+bx+cy. \quad (2)$$

However, as soon as the time dimension is included so that motion blur is rendered, this is no longer the case. We approach the problem of compressing stochastic buffers generated with motion blur by adding the time, t, to the predictor, but also raise the degree of the predictor terms. In general, we can use a predictor function, d(x,y,t), which is a sum of many terms:

$$d(x,y,t)=\Sigma_{mno}a_{mno}x^m y^n t^o. \quad (3)$$

We propose an array of prediction functions that are based on this equation, with different constellations of active coefficients. One could try all possible combinations when performing compression. However, we have selected a few of these that seem reasonable for the type of data we encounter. The selected modes are listed below:

| Mode | Equation |
|---|---|
| 0: Plane (x, y, t) | $d_0 = a + bx + cy + dt$ |
| 1: Patch (x, y) | $d_1 = a + bx + cy + dxy$ |
| 2: Patch (x, y, t) | $d_2 = (1 - t)(a_0 + b_0 x + c_0 y + d_0 xy)$ $+ t(a_1 + b_1 x + c_1 y + d_1 xy)$ |

For our three modes, the predictor functions have 4-8 unknown coefficients (a, b, etc). Depending on the cost of different operations in the target platform, we can obtain the prediction function from one of two proposed methods, namely using a least squares method, or using data reduction.

For least sequences, since each tile contains many samples, it is possible to set up an over-constrained linear system when determining the coefficients of the predictor functions. Often, such a system is solved by computing a pseudo-inverse, which involves many multiply-and-add operations as well as inverting a smaller matrix, which can be done using Cramer's rule. If multiply-and-add operations are inexpensive on the target platform, then a least-squares approach can be attractive in order to find the predictor function constants.

Figure 6:
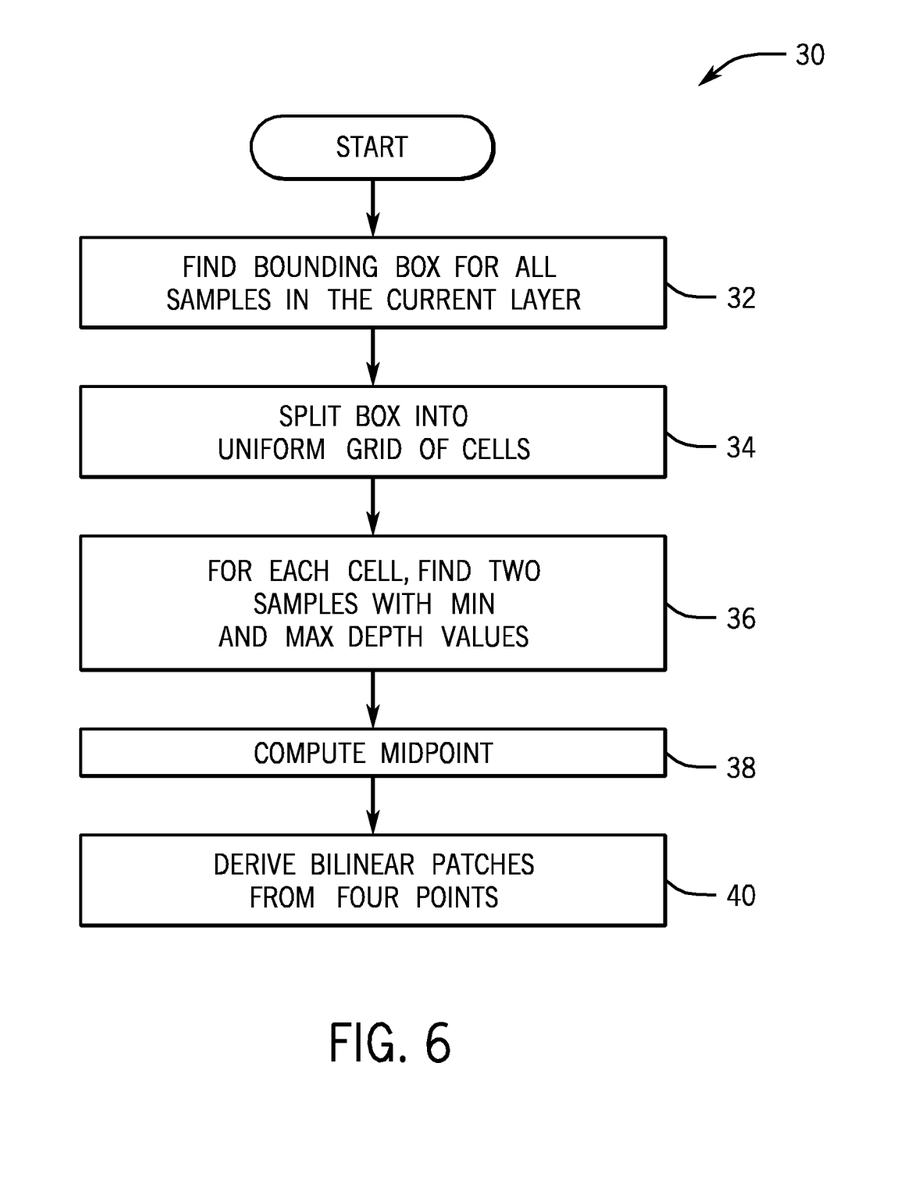
FIG. 6 is a flow chart for a predictor function according to one embodiment.

For data reduction, the following method is based on reducing the samples in a layer into a more manageable number of representative points. First, we find the bounding box in x and y for all the samples (FIG. 6, block 32). The bounding box is then split into 2×2 uniform grid cells (FIG. 6, block 34). For each cell, we find the two samples with the minimum and maximum depth values (FIG. 6, block 36). The mid-point of these two samples (in xyz) is then computed (FIG. 6, block 38). This gives us four representative points, $r^{ij}$, with $i,j \in \{0, 1\}$, where i and j are grid cell coordinates.

The sequences of FIGS. 5 and 6 can be implemented by software, hardware and/or firmware. In software and firmware embodiments the sequences may be implemented as computer executed instructions stored in one or more non-transitory computer readable media, such as magnetic, semiconductor or optical memories.

Analogously, for modes that take t into account, we can compute the bounds in t as well, and instead split the bounding box into 2×2×2 grid cells. This results in 8 representative points, $r^{ijk}$, with $i,j,k \in \{0,1\}$, instead of 4. Next, we describe how we handle each specific mode from these reduced representative data points.

Mode 0 describes a four-dimensional plane such that d(x, y,t)=a+bx+cy+dt. This representation is useful for static, as well as for moving geometry, since it contains the dt term. When computing the plane equation, we first move the origin to one of the representative points. This way we cannot compute the optimal a-coefficient. Instead, we compute it later in the differential encoding step. Now we only have the bx+cy+dt terms left to solve, and three remaining representative points. Any method suitable for solving 3×3 linear systems, such as Cramer's rule for example, can be used to compute these.

Mode 1 is for static geometry, i.e., for parts of the rendered frame without motion blur. We use a bilinear patch, which is described by d(x,y)=a+bx+cy+dxy, which we refer to as Mode 1 (FIG. 6, block 40). The motivation for this mode, compared to using just plane equations, is two-fold. First, the bilinear patch is somewhat more flexible, since it is a second-degree surface, and hence has a higher chance of adapting to smoother changes of the surface. Second, it is rather straightforward to derive a bilinear patch.

Figure 3:
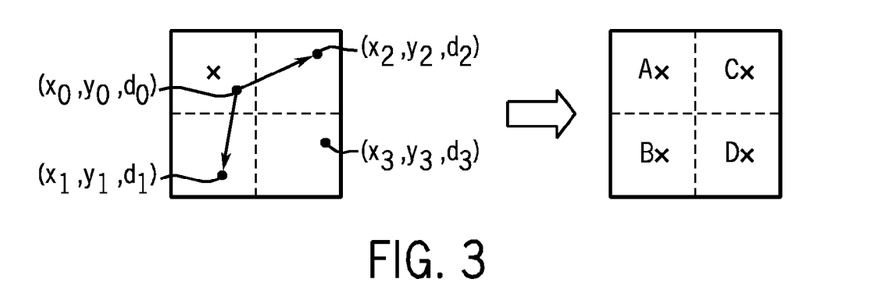
FIG. 3 is a sketch of Mode 1 where a tile and four points in the tile are shown on the left and the A, B, C and D depth values are shown in the middle of the subtiles on the right in accordance with one embodiment.

Given four depth values, A, B, C, and D, that lie in a regular 2×2 grid, it is straightforward to derive a bilinear patch as: d(x,y)=(1−x)(1−y)A+x(1−y)B+(1−x)yC+xyD. However, for a particular layer, we compute four representative points, as described above with respect to reduction, and the problem now is that each of these points may be located in (almost) arbitrary positions inside the tile, and we need to derive a bilinear patch from these. We solve this as illustrated in FIG. 3, where we simply compute a plane from three points, and evaluate the depth of the plane in the desired xy location.

For Mode 1, we obtain four points, $(x_i,y_i,z_i)$, $i \in \{0,1,2,\}$ and we need to compute the depths, A, B, C and D, in the middle of the subtiles as shown to the right. For example, for the top-left subtile, the plane equation is computed from $(x_0,y_0,z_0)$, $(x_1,y_1,z_1)$, and $(x_2,y_2,z_2)$. The plane equation is then evaluated in the center of the top-left subtile, which yields A. Using A, B, C, and D, it is straightforward to rewrite it on the form: d(x,y)=a+bx+cy+dxy. Note that it is also possible to set up a system of linear equations and directly solve for b, c, and d using, for example, Cramer's rule.

Mode 2 linearly interpolates two bilinear patches ($P_0$ and $P_1$) positioned in t=0 and in t=1, to capture a surface moving over time. Hence, we get the equation $z(x,y,t)=P_0+t(P_1-P_0)$. To compute this representation, we first perform data reduction to produce 2×2×2 representative points $r^{ijk}$. The four representative points $r^{ijk}$, $i,j \in \{0,1\}$ are used to compute the two patches $P_k$, $k \in \{0,1\}$ in the same manner as for Mode 1. Each patch $P_k$ now approximately represents the tile data at the time $$t_k = \frac{\max(r_t^{ijk}) + \min(r_t^{ijk})}{2}.$$

We now have all eight coefficients needed for this mode. In a final step, the two patches are positioned at times $t_0=0$ and $t_1=1$ through extrapolation.

Figure 4:
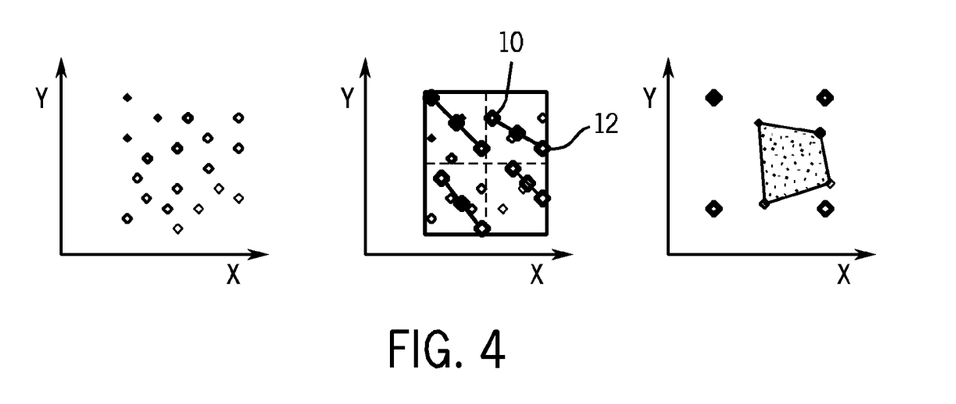
FIG. 4 is composed of three graphs of the prediction function and how they have similar data reduction steps with a left figure showing a set of irregular samples with grayscale samples indicating the depth, the middle graph showing a bounding box of samples such that the box is split in half in the xy dimensions and in each resulting sub-region a representative depth and position is created from the mean of the two depth values (min and max in the subtile) and in the right figure, a data prediction patch is depicted according to one embodiment.

All of our prediction functions have a similar data reduction step. FIG. 4 shows the setup process for the xy-patch mode. On the left, we start with a set of irregular samples. The grayscale of the samples indicates their depths. In the middle, the bounding box of the samples is found. The box is split in half in the xy dimensions. In each resulting sub-region a representative depth and position is created from the mean of the two samples with the minimum depths 10 and maximum depths 12. On the right, we now have a data prediction patch. To make decompression easier, the approximate depths need to be evaluated in four implicit locations known to the decompressor.

Due to clustering and cleared samples, some grid cells in the data reduction step may end up without any samples, and so we cannot create their representatives $r^{ij(k)}$. To remedy this, we estimate new representative points using the neighboring grid cells. For simplicity, we only fill in missing data over the xy neighbors, and not in t. Thus, we only have to consider the 2×2 partition case, and execute it twice for time-dependent modes.

If only one grid cell is missing samples, we create a plane from other three points, and evaluate it at the center of the empty grid cell.

If there are only two representative points, e.g., $r^{00}$ and $r^{01}$, and two empty grid cells, we create a new point, $r^{10}$ as shown below:

$$e = r^{01} - r^{00},$$

$$r^{10} = (r_x^{00} - e_y, r_y^{00} + e_x, r_z^{00}), \qquad (4)$$

where the first two components of $r^{10}$ are created by rotating the difference vector, e, 90 degrees in x and y and adding it to the x and y of $r^{00}$. The other components are simply copied from $r^{00}$. This extrudes a plane from the vector from $r^{00}$ to $r^{01}$. When this third representative point has been created, we proceed as if one representative point was missing. Finally, if only one representative point exists, then representative points are created in the middle of each empty grid cell. Their depth values are set to that of the existing point.

In a final step, we compute correction terms that encode how a specific sample can be recreated from the predictor functions. We need to store two values for every sample. The first is a layer index, which associates that sample with a certain layer. Typically, we use between one and four layers, so we need up to two bits to store this index. If a tile can be compressed using a single layer, we do not have to store these indices.

The second per-sample values to store are the correction terms, $\delta_i$. These are found by looping over all of samples in the layer and computing the difference between the predicted value, d(x,y,t), and the actual depth of the sample. During this phase, we track the required number of bits to store the correction terms, and also compute the a-constant for our predictor functions. The a-constant is set so that we only get unsigned correction terms (i.e., all samples lie above the predictor function).

For k correction bits per correction term, we reserve the value $2^k-1$ as a clear value, and can hence only use correction terms of up to (and including) $2^k-2$. However, we get the benefit of being able to signal whether a particular sample still is cleared in a very inexpensive way in one embodiment. Otherwise, this is usually done using a particular value in the layer index.

Figure 7:
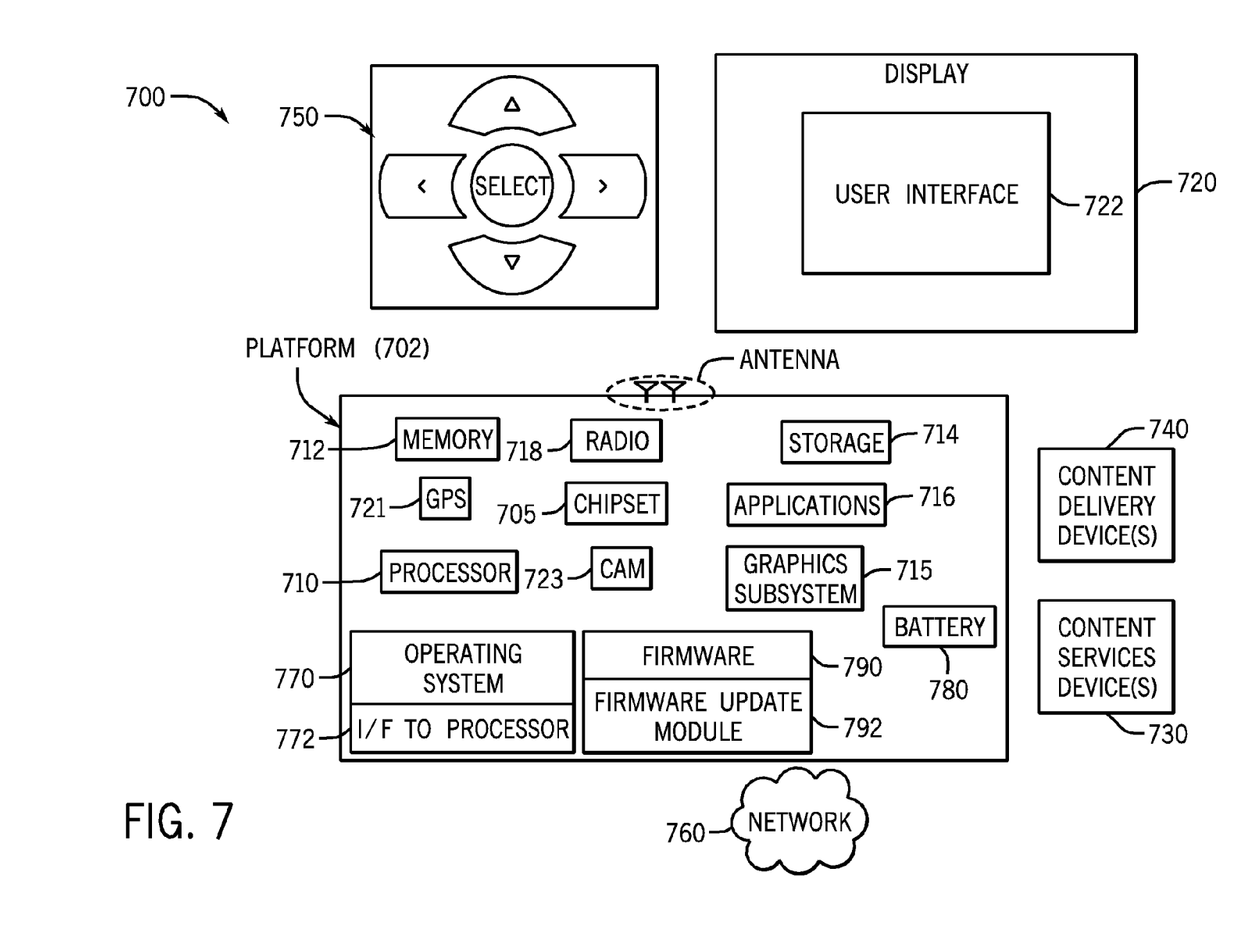
FIG. 7 is a hardware depiction for one embodiment of the present invention.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 5 and 6 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720.

Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 8:
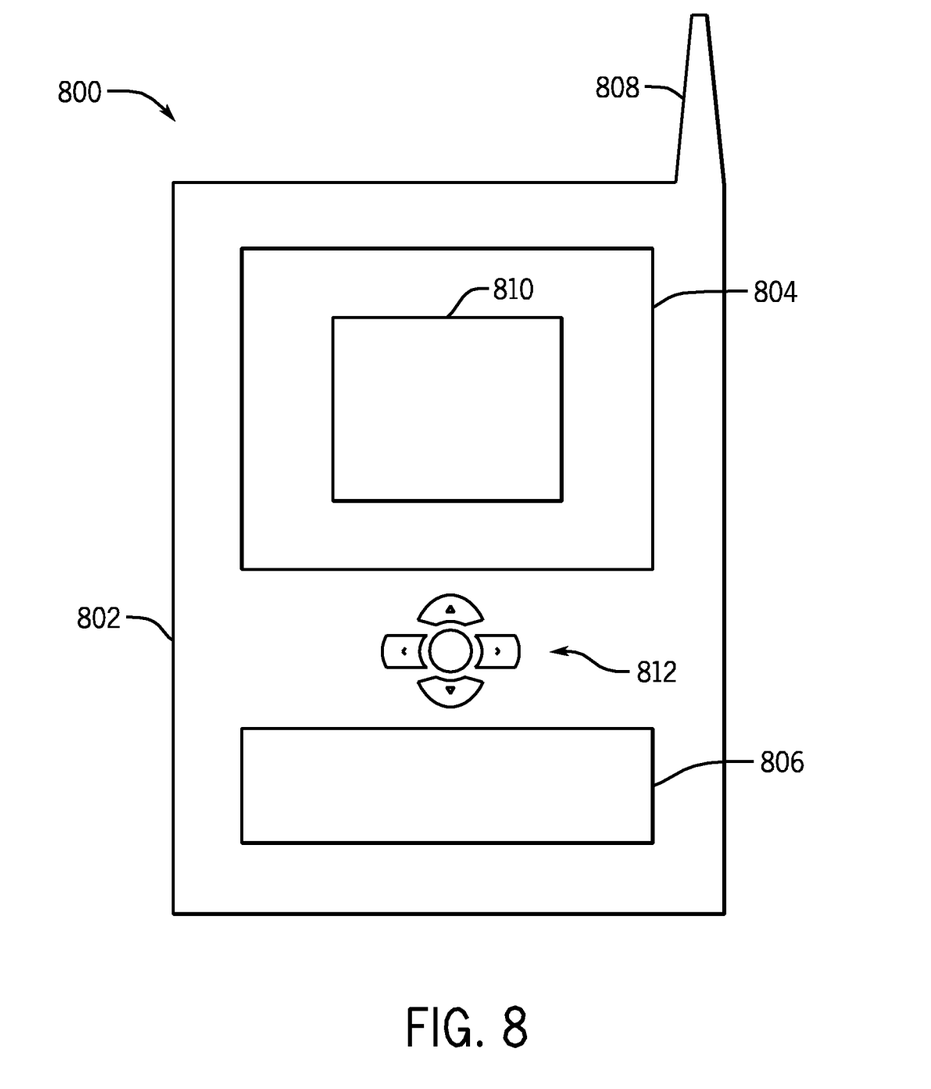
FIG. 8 is a front elevational view of one embodiment of the present invention.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

What is claimed is:

1. A method comprising:
creating a patch for a block of pixels, wherein each pixel has a plurality of samples;
clustering samples into layers by splitting a depth interval into bins, marking the bins with at least one depth value, and locating the largest gaps in depth values between bins;
generating a predictor function for a layer using actual depth sample values and sample positions in screen space to predict a depth value at each sample;
computing a difference between the predicted depth value and the actual depth value of samples in a layer; and
encoding the difference.

2. The method of claim 1 including determining whether the scene is blurred or non-blurred.

3. The method of claim 2 including developing a bilinear patch for non-blurred scenes.

4. The method of claim 3 including using sample positions in screen space and depth values to develop said patch.

5. The method of claim 2 including developing a trilinear patch for blurred scenes.

6. The method of claim 5 including using sample position in screen space, depth values and sample time to develop said patch.

7. The method of claim 1 including compressing the depth values and storing the compressed representation in a memory.

8. The method of claim 1 including developing a patch by finding a bounding box for all samples in a current layer, splitting the box into a uniform grid of cells, and for each cell finding two samples with minimum and maximum depth values.

9. The method of claim 8 including computing the midpoint between set minimum and maximum depth values.

10. The method of claim 9 including deriving a bilinear patch from four mid point values.

11. An apparatus comprising:
a processor to develop a patch for a scene, wherein each pixel has a plurality of samples, cluster samples into layers by splitting a depth interval into bins, marking the bins with at least one depth value, and locating the largest gaps in depth values between bins, generate a predictor function for a layer using actual depth sample values and sample positions in screen space to predict a depth value at each sample, compute a difference between the predicted depth value and the actual depth value of samples in a layer and
a memory coupled to said processor.

12. The apparatus of claim 11, wherein said processor to determine whether the scene is blurred or non-blurred.

13. The apparatus of claim 12, wherein said processor to develop a bilinear patch for non-blurred scenes.

14. The apparatus of claim 13, wherein said processor to use sample position in screen space and depth values to develop said patch.

15. The apparatus of claim 11, wherein said processor to develop a trilinear patch for blurred scenes.

16. The apparatus of claim 15, wherein said processor to use sample position in screen space, depth values and time to develop said patch.

17. The apparatus of claim 11, wherein said processor to use only a position of the sample and screen space and the depth of the sample to compress depth values.

18. The apparatus of claim 11, wherein said processor to compress depth values without using information from a rasterizer.

19. The apparatus of claim 11, wherein said processor to compress the depth values and storing the values in said memory wherein said memory is not integrated with said processor.

20. The apparatus of claim 11, wherein said processor to perform clustering by splitting a depth interval into bins, marking the bins with at least one depth value, and locating the largest gaps and depths values between bins.

21. At least one non-transitory machine readable medium storing instructions executed by a processor to perform a sequence comprising:
creating a patch for a block of pixels, wherein each pixel has a plurality of samples;

clustering samples into layers by splitting a depth interval into bins, marking the bins with at least one depth value, and locating the largest gaps in depth values between bins;

generating a predictor function for a layer using actual depth sample values and sample positions in screen space to predict a depth value at each sample;

computing a difference between the predicted depth value and the actual depth value of samples in a layer; and encoding the difference.

22. The media of claim 21, said sequence including determining whether the scene is blurred or non-blurred.

23. The media of claim 22, said sequence including developing a bilinear patch for non-blurred scenes.

24. The media of claim 23, said sequence including using sample positions in screen space and depth values to develop said patch.

25. The media of claim 24, said sequence including developing a trilinear patch for blurred scenes.

26. The media of claim 23, said sequence including using sample position in screen space, depth values and sample time to develop said patch.

27. The media of claim 26, said sequence including compressing the depth values and storing the compressed representation in a memory.

28. The media of claim 21, said sequence including developing a patch by finding a bounding box for all samples in a current layer, splitting the box into a uniform grid of cells, and for each cell finding two samples with minimum and maximum depth values.

29. The media of claim 28, said sequence including computing the mid-point between set minimum and maximum depth values.

30. The media of claim 29, said sequence including deriving a bilinear patch from four mid point values.

* * * * *